US010622669B2

(12) United States Patent
Lee et al.

(10) Patent No.: US 10,622,669 B2
(45) Date of Patent: Apr. 14, 2020

(54) LITHIUM-SULFUR BATTERY SEPARATION FILM HAVING COMPOSITE COATING LAYER INCLUDING POLYDOPAMINE, MANUFACTURING METHOD THEREFOR, AND LITHIUM-SULFUR BATTERY COMPRISING SAME

(71) Applicants: LG CHEM, LTD., Seoul (KR); KOREA ADVANCED INSTITUTE OF SCIENCE AND TECHNOLOGY, Daejeon (KR)

(72) Inventors: Seong Ho Lee, Daejeon (KR); Haeshin Lee, Daejeon (KR); Sun Jin Kim, Guri-si (KR); Doo Kyung Yang, Daejeon (KR); Ki Young Kwon, Daejeon (KR)

(73) Assignees: LG CHEM, LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 41 days.

(21) Appl. No.: 15/742,426

(22) PCT Filed: Jan. 16, 2017

(86) PCT No.: PCT/KR2017/000530
§ 371 (c)(1),
(2) Date: Jan. 5, 2018

(87) PCT Pub. No.: WO2017/131377
PCT Pub. Date: Aug. 3, 2017

(65) Prior Publication Data
US 2018/0198156 A1  Jul. 12, 2018

(30) Foreign Application Priority Data

Jan. 28, 2016  (KR) .................. 10-2016-0010969

(51) Int. Cl.
*H01M 10/04* (2006.01)
*H01M 10/052* (2010.01)
*H01M 2/14* (2006.01)
*H01M 2/16* (2006.01)
*H01M 4/136* (2010.01)
*H01M 4/40* (2006.01)
*H01M 4/38* (2006.01)
*H01M 4/02* (2006.01)

(52) U.S. Cl.
CPC ......... *H01M 10/052* (2013.01); *H01M 2/145* (2013.01); *H01M 2/166* (2013.01); *H01M 2/1653* (2013.01); *H01M 2/1686* (2013.01); *H01M 4/136* (2013.01); *H01M 4/405* (2013.01); *H01M 10/0459* (2013.01); *H01M 2/162* (2013.01); *H01M 4/38* (2013.01); *H01M 4/382* (2013.01); *H01M 2004/027* (2013.01); *H01M 2004/028* (2013.01); *Y02T 10/7011* (2013.01)

(58) Field of Classification Search
CPC .. H01M 10/052; H01M 2/166; H01M 2/1653; H01M 2/1686; H01M 4/136; H01M 4/405; H01M 10/0459; H01M 2/145; H01M 4/382; H01M 4/38; H01M 2/162; H01M 2004/027; H01M 2004/028; Y02T 10/7011
See application file for complete search history.

(56) References Cited

U.S. PATENT DOCUMENTS

| 2012/0000845 | A1 | 1/2012 | Park et al. |
| 2014/0234692 | A1 | 8/2014 | Wegner et al. |
| 2014/0342214 | A1 | 11/2014 | Wegner et al. |
| 2015/0056517 | A1* | 2/2015 | Zhou ................ H01M 10/0525 429/310 |
| 2015/0287992 | A1 | 10/2015 | Osaka et al. |
| 2015/0303515 | A1 | 10/2015 | Pratt et al. |
| 2015/0318532 | A1* | 11/2015 | Manthiram ......... H01M 2/1686 429/105 |

FOREIGN PATENT DOCUMENTS

| CN | 104051695 A | 9/2014 |
| CN | 104103791 A | 10/2014 |
| CN | 105261721 A | 1/2016 |
| JP | 2014-523630 A | 9/2014 |

(Continued)

OTHER PUBLICATIONS

European Search Report for Appl. No. 17744499.9 dated Apr. 6, 2018.
Kim, J.S., et al, "A Lithium-Sulfur Battery with a High Areal Energy Density," Adv. Funct. Mater., Sep. 10, 2014, vol. 24, No. 34, pp. 5359-5367.
Kim et al., "A Lithium-Sulfur Battery with a High Areal Energy Density", Advanced Functional Materials, vol. 24, 2014, pp. 5359-5367.
Hong et al., "Non-Covalent Self-Assembly and Covalent Polymerization Co-Contribute to Polydopamine Formation", Adv. Funct. Mater. 2012, pp. 1-7.

(Continued)

*Primary Examiner* — Muhammad S Siddiquee
(74) *Attorney, Agent, or Firm* — Birch, Stewart, Kolasch & Birch, LLP

(57) ABSTRACT

The present invention relates to a separator for a lithium-sulfur battery having a composite coating layer including polydopamine, and a method for preparing the same, and in particular, to a lithium-sulfur battery suppressing lithium polysulfide elution by using a composite coating layer including polydopamine and a conductive material on one surface of a separator. In the lithium-sulfur battery according to the present invention, a porous structure of polydopamine adsorbs lithium polysulfide eluted from a positive electrode preventing elution and diffusion, and by providing additional electric conductivity, a reaction site of a positive electrode active material is provided, and therefore, battery capacity and life time properties are enhanced.

10 Claims, 2 Drawing Sheets

(56) References Cited

FOREIGN PATENT DOCUMENTS

| | | |
|---|---|---|
| JP | 2015-501070 A | 1/2015 |
| JP | 2015-201270 A | 11/2015 |
| KR | 10-2005-0021131 A | 3/2005 |
| KR | 10-1118473 B1 | 3/2012 |
| KR | 10-2012-0103948 A | 9/2012 |
| KR | 10-1198493 B1 | 11/2012 |
| KR | 10-1261703 B1 | 5/2013 |
| KR | 10-2013-0099463 A | 9/2013 |
| KR | 10-2013-0127201 A | 11/2013 |
| KR | 10-1327891 B1 | 11/2013 |
| KR | 10-2013-0141234 A | 12/2013 |
| KR | 10-1367577 B1 | 2/2014 |
| KR | 10-1455943 B1 | 11/2014 |
| KR | 10-2015-0004358 A | 1/2015 |
| KR | 10-2015-0118468 A | 10/2015 |
| WO | WO 2013/154623 A1 | 10/2013 |

OTHER PUBLICATIONS

International Search Report for PCT/KR2017/000530 (PCT/ISA/210) dated Apr. 27, 2017.
Lee et al., "A reversible wet/dry adhesive inspired by mussels and geckos", vol. 448, Jul. 19, 2007, pp. 338-341.
Lee et al., "Mussel-Inspired Surface Chemistry for Multifunctional Coatings", vol. 318, Oct. 19, 2007, pp. 426-430.
Wang et al:, "Interface Chemistry Guided Long-Cycle-Life Li—S Battery", ACS Publications, 2013 American Chemical Society, pp. 4206-4211.
Zhang et al., "Polydopamine-coated separator for high-performance lithium-sulfur batteries", Journal of Solid State Electrochemistry (2015), vol. 19, No. 6, pp. 1709-1715.

* cited by examiner

[Figure 1]
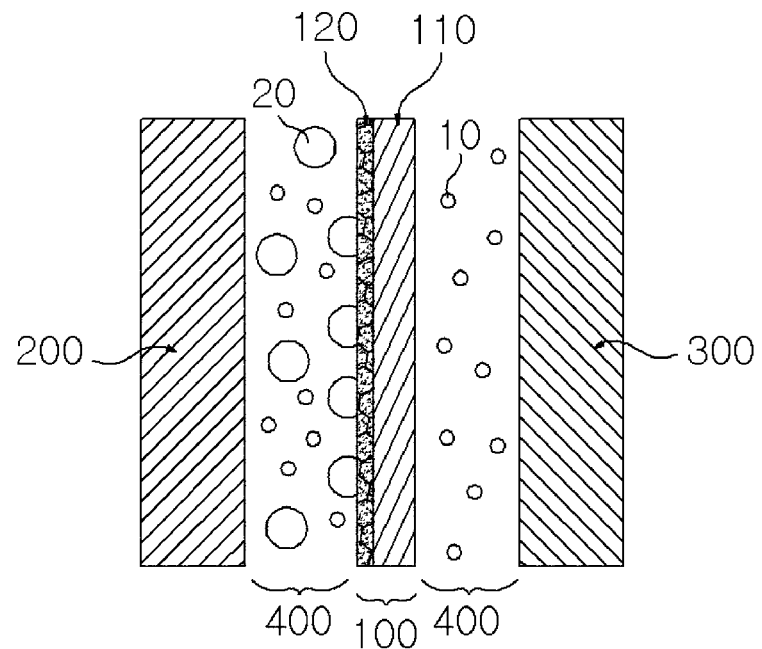
[Figure 2]
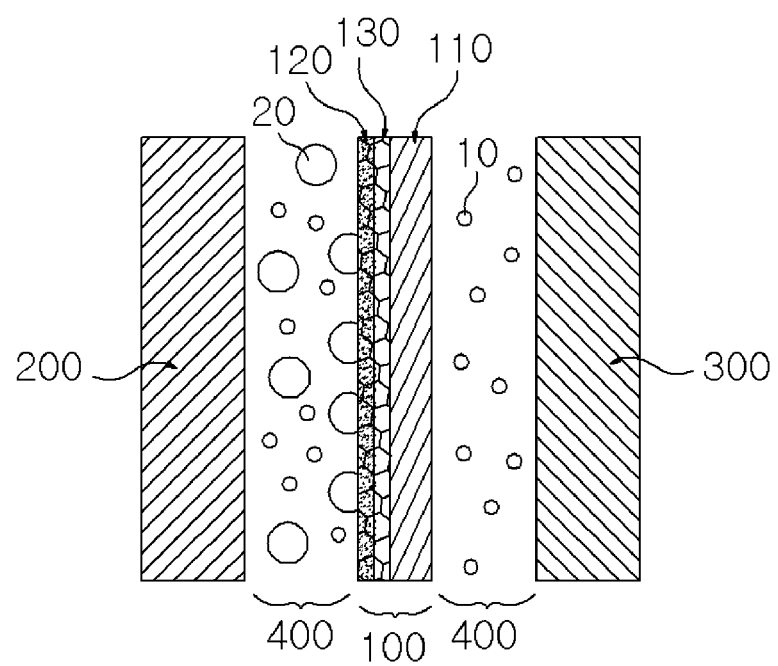

[Figure 3]
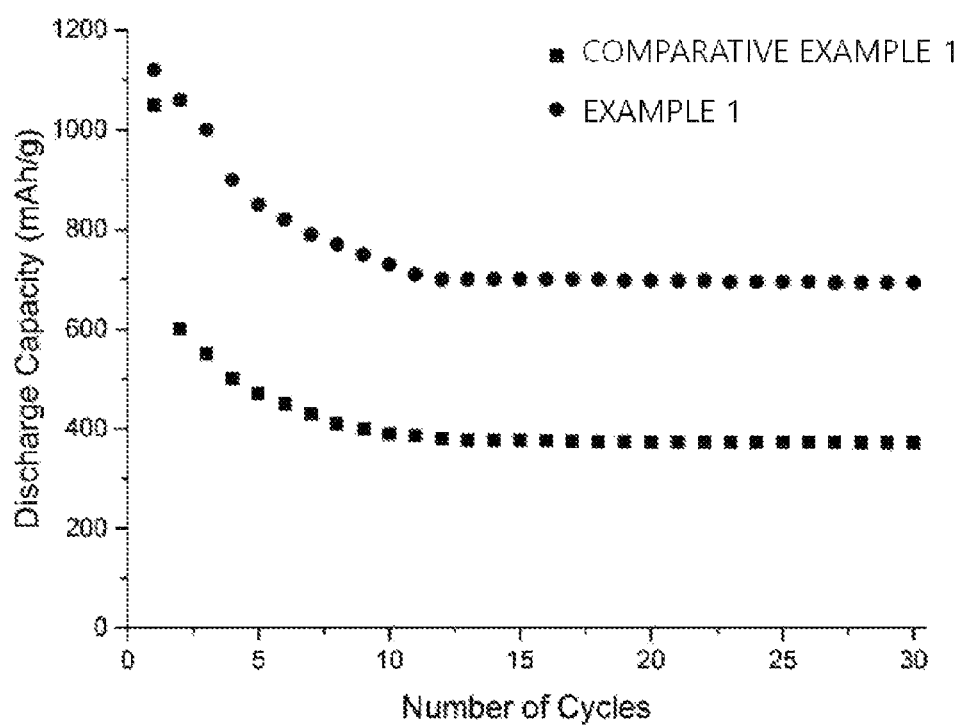

LITHIUM-SULFUR BATTERY SEPARATION FILM HAVING COMPOSITE COATING LAYER INCLUDING POLYDOPAMINE, MANUFACTURING METHOD THEREFOR, AND LITHIUM-SULFUR BATTERY COMPRISING SAME

TECHNICAL FIELD

This application claims priority to and the benefits of Korean Patent Application No. 10-2016-0010969, filed with the Korean Intellectual Property Office on Jan. 28, 2016, the entire contents of which are incorporated herein by reference.

The present invention relates to a separator for a lithium-sulfur battery having a composite coating layer including polydopamine and a method for preparing the same.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium secondary batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) currently studied, and therefore, is a most promising battery among batteries that have been developed so far.

During a discharge reaction of a lithium-sulfur (Li—S) battery, an oxidation reaction of lithium occurs in a negative electrode (anode), and a reduction reaction of sulfur occurs in a positive electrode (cathode). Sulfur has a cyclic $S_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted to linear-structured lithium polysulfide ($Li_2S_x$, x=8, 6, 4 and 2) from cyclic $S_8$ by the reduction reaction, and as a result, lithium sulfide ($Li_2S$) is lastly produced when such lithium polysulfide is completely reduced. By the process of being reduced to each lithium polysulfide, a discharge behavior of a lithium-sulfur (Li—S) battery shows gradual discharging voltages unlike lithium ion batteries.

Among lithium polysulfide such as $Li_2S_8$, $Li_2S_6$, $Li_2S_4$ and $Li_2S_2$, lithium polysulfide having a high sulfur oxidation number ($Li_2S_x$, commonly x>4) is particularly readily dissolved in a hydrophilic liquid electrolyte. Lithium polysulfide dissolved in the liquid electrolyte is diffused away from a lithium polysulfide-produced positive electrode due to a concentration difference. Lithium polysulfide eluted from the positive electrode as above is washed away out of the positive electrode reaction area making it impossible to be gradually reduced to lithium sulfide ($Li_2S$). In other words, lithium polysulfide present in a dissolved state outside the positive electrode and the negative electrode is not able to participate in charge and discharge reactions of a battery, and therefore, the sulfur material amount participating in an electrochemical reaction in the positive electrode decreases, and as a result, it becomes a main factor causing a charge capacity decrease and an energy decrease of a lithium-sulfur battery.

Furthermore, apart from those floating or immersed in the liquid electrolyte, lithium polysulfide diffusing to the negative electrode directly reacts with lithium and is fixed on the negative electrode surface in a $Li_2S$ form, which causes a problem of corroding the lithium metal negative electrode.

In order to minimize such lithium polysulfide elution, studies on changing morphology of a positive electrode composite filling various carbon structures with sulfur particles have been ongoing, however, such methods are complicated in the preparation and have not resolved fundamental problems.

DISCLOSURE

Technical Problem

As described above, lithium-sulfur batteries have a problem in that battery capacity and life time properties decline due to lithium polysulfide eluted and diffused from a positive electrode.

Accordingly, an aspect of the present invention provides a separator for a lithium-sulfur battery suppressing elution and diffusion of lithium polysulfide and providing an additional reduction reaction site thereof.

Another aspect of the present invention provides a method for preparing the separator for a lithium-sulfur battery.

Another aspect of the present invention provides a lithium-sulfur battery including the separator for a lithium-sulfur battery.

Technical Solution

According to an aspect of the present invention, there is provided a separator for a lithium-sulfur battery including a separator body and a composite coating layer including polydopamine and a conductive material on one surface of the separator body facing a positive electrode.

According to another aspect of the present invention, there is provided a method for preparing a separator for a lithium-sulfur battery including preparing a separator body; preparing slurry by mixing polydopamine, a conductive material and a solvent; coating the slurry on at least one surface of the separator body; and forming a composite coating layer by drying the coated separator.

According to another aspect of the present invention, there is provided a lithium-sulfur battery including the separator for a lithium-sulfur battery.

Advantageous Effects

In a lithium-sulfur battery according to the present invention, a porous structure of a conductive material included in a composite coating layer adsorbs lithium polysulfide eluted from a positive electrode preventing elution and diffusion, and by providing additional electric conductivity, a reaction site of a positive electrode active material is provided, and therefore, battery capacity and life time properties can be enhanced.

DESCRIPTION OF DRAWINGS

FIG. 1 is a sectional diagram of a lithium-sulfur battery including a separator having a composite coating layer as a first embodiment of the present invention.

FIG. 2 is a sectional diagram of a lithium-sulfur battery including a separator having a composite coating layer and a polydopamine coating layer as a second embodiment of the present invention.

FIG. 3 is a graph showing discharge cycle properties of Example 1 and Comparative Example 1 according to the present invention.

BEST MODE

Hereinafter, preferred examples of the present invention will be described in detail with reference to accompanying illustrative drawings. Such drawings correspond to one embodiment for describing the present invention, may be implemented in various different forms, and are not limited to the present specification. In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

Separator for Lithium-Sulfur Battery

The present invention provides a separator for a lithium-sulfur battery including a composite coating layer including polydopamine and a conductive material on at least one surface of the separator body for preventing lithium polysulfide diffusion and providing an additional site of a reduction reaction of sulfur. At least one surface of the separator body is one surface or both surfaces required to include a surface facing a positive electrode when assembling a battery.

FIG. 1 is a sectional diagram illustrating a lithium-sulfur battery according to a first embodiment of the present invention. As illustrated in FIG. 1, a lithium-sulfur battery has a structure including a positive electrode (200) and a negative electrode (300), and providing an electrolyte (400) and a separator (100) therebetween, and particularly, the present invention provides a multilayer-structured separator (100) in which a separator body (110) and a composite coating layer (120) are consecutively laminated. Herein, the composite coating layer (120) may be formed on one side surface of the separator body (110) as shown in FIG. 1, and as necessary, the composite coating layer may be formed on both side surfaces.

The separator body (110) is not limited in its material in the present invention, and those commonly used as a separator with functions of physically separating electrodes and having electrolyte and ion penetrability may be used without particular limit, however, as a material that is porous and nonconductive or insulating, those having an excellent liquid electrolyte moisture retention ability while having low resistance for ion migration of the liquid electrolyte are particularly preferred.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

Particularly, by forming the composite coating layer (120) on the separator body (110), the present invention prevents lithium polysulfide diffusion and provides an additional site of a reduction reaction of sulfur.

Dopamine, a monomer form of polydopamine included in the composite coating layer (120), is well-known as a neurotransmitter, and is a mimicking molecule of a 3,4-dihydroxy-L-phenylalanine (L-DOPA) molecule discovered in Mussels in the sea. Particularly, polydopamine produced by oxidant-induced self-polymerization and electrochemical polymerization of dopamine has covalent bond catechol and imine functional groups, and forms very strong bonds not only in organic matters such as biomaterials or synthetic polymers but also on solid surfaces such as battery electrodes or separators, and therefore, surface reforming, surface modification, self-assembled multilayer formation, nanocomposite thin film formation and the like may be obtained. The catechol functional group of dopamine is readily oxidized under the presence of oxygen and may form polydopamine thin film having various thicknesses by self-polymerization.

Dopamine, an organic substance that is environmental-friendly and readily obtained, forms self-polymerization in a buffer solution having a pH of approximately 8.5, and polydopamine formed through this process has very strong reactivity and readily makes new bonds on the surface. In addition, polydopamine may be self-polymerized at room temperature enabling coating without additional reagents or devices, and therefore, manufacturing process cost and process efficiency are excellent.

Such polydopamine is a material having high adhesive strength and is capable of thin and even coating, and as illustrated in FIG. 1, lithium polysulfide (20) may not penetrate while readily diffusing lithium ions (10) into a positive electrode, and it may prevent lithium polysulfide (20) diffusion while activating an electrode reaction, and therefore, the present invention uses polydopamine as the composite coating layer (120) of the separator of a lithium-sulfur battery.

In addition, the composite coating layer (120) of the present invention includes a conductive material together with the polydopamine described above in order to provide additional electric conductivity to a lithium-sulfur battery. Sulfur, a positive electrode active material of a lithium-sulfur battery, does not have conductivity by itself, and therefore is generally composited with a conductive carbon-based material to be prepared as a positive electrode (200). The composite coating layer (120) of the present invention includes a conductive material, and thereby provides an additional reduction reaction site of a sulfur material in addition to a positive electrode reaction site.

More specifically, the composite coating layer (120) adsorbs lithium polysulfide ($Li_2S_x$, x=8, 6, 4, 2) (20), an intermediate product during sulfur reduction, due to a porous structure of the conductive material, and thereby suppresses diffusion thereof. In addition, electrode efficiency may increase by the conductive material of the composite coating layer (120) additionally providing a reduction reaction site of the adsorbed lithium polysulfide (20).

The conductive material included in the composite coating layer (110) according to the present invention may be selected from the group consisting of carbon-based conductors, conductive polymers and combinations thereof.

The carbon-based conductor is not limited in the type, but may include one type selected from the group consisting of graphite-based such as natural graphite, artificial graphite, expanded graphite, graphene, Super-P or Super-C, activated carbon-based, carbon black-based such as channel black, denka black, furnace black, thermal black, contact black, lamp black or acetylene black; carbon fiber-based, carbon nanostructures such as carbon nanotubes (CNT) or fullerene, and combinations thereof, and preferably, Super-P is used.

The conductive polymer is not limited in the type, but may include one type selected from the group consisting of polyaniline, polypyrrole, polythiopene, polyazulene, polypyridine, polyindole, polycarbazole, polyazine, polyquinone, polyacetylene, polyselenophene, polytellurophene, poly-para-phenylene, polyphenylene vinylene (PPV), polyphenylene sulfide (PPS), polyethylenedioxythiophene (PEDT) and combinations thereof.

In order to obtain the effect of preventing lithium polysulfide diffusion described above and to obtain the effect of providing conductivity for providing a reduction reaction site of lithium polysulfide, a weight ratio of the polydopamine and the conductive material may be controlled within a range of 3:1 to 7:1. When the polydopamine is used in excess compared to the above-mentioned range, it functions as a resistive layer causing a problem of battery performance decline, and when the conductive material is used in excess, the polydopamine content relatively decreases making it difficult to secure an effect obtained by polydopamine, and therefore, the content is properly employed within the above-mentioned range.

In order to secure the above-mentioned effects, such a composite coating layer (120) is formed to a thickness of 0.1 µm to 10 µm and preferably 0.1 µm to 5 µm on the separator body (110). When the thickness is less than the above-mentioned range, an effect of lithium polysulfide adsorption is insignificant, and when the thickness is greater than the above-mentioned range, lithium ion conductivity decreases causing a problem in the battery performance, and therefore, the thickness is properly employed within the above-mentioned range.

Additionally, the separator (100) having a multilayer structure of separator body (110)/composite coating layer (120) according to the first embodiment described above may increase the effect by further providing other layers therebetween.

FIG. 2 is a sectional diagram illustrating a lithium-sulfur battery according to a second embodiment of the present invention, and as illustrated in FIG. 2, a lithium-sulfur battery according to the second embodiment is provided with a polydopamine coating layer (130) between a separator body (110) and a composite coating layer (120) as a separator. Herein, the separator body (110) and the composite coating layer (120) follow the descriptions in the first embodiment.

The additionally provided polydopamine coating layer (130) is used for the purpose of enhancing adhesive strength at an interface between the separator body (110) and the composite coating layer (120), and the effect of lithium polysulfide collection due to polydopamine described above may be further secured. Herein, the polydopamine coating layer (130) is formed to have a thickness of 0.1 µm to 10 µm. The thickness being greater than the above-mentioned range causes a problem of reducing lithium ion conductivity, and therefore, the thickness is preferably formed to a maximum of 10 µm or less.

Method for Preparing Separator for Lithium-Sulfur Battery

The separator for a lithium-sulfur battery provided in the first embodiment of the present invention as shown in FIG. 1 may be prepared by performing the following procedures.

First, a separator body (110) is prepared. The separator body (110) is not particularly limited in the present invention, and any one of the separator bodies described above may be selected. The separator body may be directly prepared, or commercially-available separators may be purchased to be used.

Next, after mixing polydopamine and a conductive material in the above-mentioned weight ratio of 3:1 to 7:1, the mixture is dispersed into a prescribed solvent to prepare the result in a slurry state. Herein, a separate binder is not required due to an adhesion property of the polydopamine itself. As the solvent, those capable of uniformly dispersing the polydopamine and the conductive material and readily evaporating are preferably used. Specifically, acetonitrile, methanol, ethanol, tetrahydrofuran, water, isopropyl alcohol and the like may be included. In addition, as for the mixing for preparing the slurry, common methods may be used for the stirring using common mixers such as a paste mixer, a high shear mixer and a homo-mixer.

Next, the prepared slurry is coated on one surface of the separator body (110). Herein, one surface of the separator body (110) is one surface of the separator body (110) assembled facing a positive electrode (200) when assembling an electrode. Herein, the method of wet coating the slurry is not limited, and for example, methods of doctor blade coating, dip coating, gravure coating, slit die coating, spin coating, comma coating, bar coating, reverse roll coating, screen coating, cap coating and the like may be carried out.

Next, the coated separator is dried to form a composite coating layer (120). The drying process is a process removing the solvent and moisture in the slurry for drying the slurry coated on a metal current collector, and drying temperature and time may vary depending on the solvent used. Generally, the drying is preferably carried out for 48 hours or less in a vacuum oven at 50° C. to 200° C.

In addition, the separator for a lithium-sulfur battery provided in the second embodiment of the present invention as shown in FIG. 2 may be prepared using the preparation method mentioned above in the first embodiment, and the polydopamine coating layer (130) may be coated on the separator body (110) before coating the composite coating layer (120).

Herein, the polydopamine coating layer (130) is obtained by preparing a coating solution dispersing polydopamine into the solvent described above and then carrying out a wet coating process, and any one method of the coating methods provided in the first embodiment may be used.

Lithium-Sulfur Battery

The separator (100) provided in the first embodiment and the second embodiment described above may be preferably used as a separator of a lithium-sulfur battery, and as illustrated in FIG. 1 and FIG. 2, the separator (100) is provided between a positive electrode (200) and a negative electrode (300), and when a composite coating layer (120) is coated on only one surface, the composite coating layer (120) is preferably disposed to face the positive electrode (200) in the assembly.

The positive electrode (200) may include elemental sulfur (S8), sulfur series compounds or mixtures thereof as a positive electrode active material, and these may be used as a composite with a conductor since a sulfur material itself does not have electrical conductivity. The sulfur series compound may specifically be $Li_2S_n$ (n≥1), an organosulfur compound, a carbon-sulfur polymer (($C_2S_x)_n$: x=2.5 to 50, n≥2) or the like.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber, carbon nanotubes (CNT) and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The negative electrode (300) may use a material capable of reversibly intercalating or deintercalating lithium ions ($Li^+$), a material capable of reversibly forming a lithium-containing compound by reacting with lithium ions, lithium metal or a lithium alloy as a negative electrode active material. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), silicon (Si) and tin (Sn).

In addition, while charging and discharging a lithium-sulfur battery, sulfur used as a positive electrode active material may be changed to an inactive material and attached on a lithium negative electrode surface. Inactive sulfur means sulfur that has gone through various electrochemical or chemical reactions and is not able to participate in an electrochemical reaction of a positive electrode any more, and the inactive sulfur formed on the lithium negative electrode surface has an advantage of performing a role of a protective layer of the lithium negative electrode.

An electrolyte (400) impregnated into the positive electrode (200), the negative electrode (300) and the separator (100) is, as a lithium salt-containing non-aqueous electrolyte, formed with a lithium salt and a liquid electrolyte, and in addition thereto, an organic solid electrolyte, an inorganic solid electrolyte and the like are used.

The lithium salt of the present invention is a material to be favorably dissolved in a non-aqueous organic solvent, and for example, one or more selected from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, LiN $(CF_3SO_2)_2$, $LiNO_3$, chloroborane lithium, lower aliphatic carboxylic acid lithium, lithium tetraphenylborate and imide may be included.

The concentration of the lithium salt may be from 0.2 M to 4 M, specifically from 0.3 M to 2 M and more specifically from 0.3 M to 1.5 M depending on various factors such as an accurate composition of the liquid electrolyte mixture, solubility of the salt, conductivity of the dissolved salt, charge and discharge conditions of a battery, a working temperature, and other factors known in the lithium-sulfur battery field. When the lithium salt concentration is less than 0.2 M, conductivity of the electrolyte may decrease causing decline in the battery performance, and when the lithium salt concentration is greater than 4 M, viscosity of the electrolyte increases leading to a decrease in the lithium ion ($Li^+$) mobility.

The non-aqueous organic solvent needs to favorably dissolve the lithium salt, and examples of the non-aqueous organic solvent of the present invention may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, dioxolane, acetonitrile, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or as a mixture of two or more organic solvents.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be used.

As the inorganic solid electrolyte of the present invention, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO_4$—$Li_2S$—$SiS_2$ may be used.

With the purpose of improving charge and discharge properties and flame retardancy, for example, pyridine, triethyiphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the electrolyte of the present invention. In some cases, halogen-containing solvents such as carbon tetrachloride and trifluoroethylene may be further included in order to provide nonflammability, carbon dioxide gas may be further included in order to enhance high temperature storage properties, and fluoroethylene carbonate (FEC), propene sultone (PRS), fluoropropylene carbonate (FPC) and the like may be further included.

The electrolyte may be used as a liquid-state electrolyte or as an electrolyte separator form in a solid state. When using as a liquid-state electrolyte, a separator formed with porous glass, plastics, ceramics or polymers is further included as a physical separator having a function of physically separating electrodes.

A stack-type electrode assembly may be prepared by providing, between a positive electrode plate and a negative electrode plate obtained by cutting the positive electrode (200) and the negative electrode (300) described above to a predetermined size, a separator (100) cut to a predetermined size corresponding to the positive electrode plate and the negative electrode plate, and then stacking the result.

Alternatively, a stack and folding-type electrode assembly may be prepared by, so as to provide a positive electrode (200) and a negative electrode (300) facing each other with a separator (100) sheet therebetween, arranging two or more positive electrode plates and negative electrode plates on a separator sheet or arranging two or more unit cells laminating the two or more positive electrode plates and negative electrode plates with a separator therebetween on a separator sheet, and winding the separator sheet or folding the separator sheet to the size of the electrode plate or the unit cell.

Hereinafter, the present invention will be described in detail with reference to examples. However, examples according to the present invention may be modified to various different forms, and the scope of the present invention is not to be construed as being limited to the examples described below. The examples of the present invention are provided to those having average knowledge in the art in order to more fully describe the present invention.

Example 1

1. Preparation of Separator

Slurry prepared by mixing polydopamine and Super-P, a carbon-based conductor, in a weight ratio of 5:1 and dispersing the mixture into a basic (pH 8.5) buffer solution was coated to a thickness of 5 μm on one surface of a polypropylene film having a thickness of 20 μm to prepare a separator.

2. Manufacture of Lithium-Sulfur Battery

A positive electrode mixture having a composition of 70% by weight of a positive electrode active material prepared by mixing carbon and sulfur in a weight ratio of 9:1, 20% by weight of denka black as a conductor, and 10% by weight of SBR/CMC (weight ratio 1:1) as a binder was added to D.I water to prepare positive electrode slurry, and then the slurry was coated on an aluminum current collector to prepare a positive electrode. In the binder, SBR is styrene butadiene rubber, and CMC is carboxymethylcellulose.

Lithium foil having a thickness of approximately 150 μm was used as a negative electrode, and as a liquid electrolyte, a liquid electrolyte mixing 1 M $LiN(CF_3SO_2)_2$— dissolved dimethoxyethane and dioxolane in a volume ratio of 1:1 was used, and the prepared separator having polydopamine and Super-P coated was used to manufacture a lithium-sulfur battery.

Comparative Example 1

A lithium-sulfur battery was manufactured in the same manner as in Example 1 except that an untreated polypropylene film having a thickness of 20 μm was used as the separator instead of the separator having polydopamine and Super-P coated on polypropylene.

Experimental Example 1

For the lithium-sulfur batteries manufactured according to Example 1 and Comparative Example 1, initial capacity of each of the batteries was measured for each cycle while repeating 30 cycles of charge/discharge with 0.1 C/0.1 C. As shown in FIG. 3, it was seen that the lithium-sulfur battery of Example 1 according to the present specification had larger initial capacity and enhanced life time property as well compared to the lithium-sulfur battery of Comparative Example 1.

A battery pack including the lithium-sulfur battery may be used as a power supply of electric vehicles (EV), hybrid electric vehicles (HEV), plug-in hybrid electric vehicles (PHEV) or systems for power storage.

The invention claimed is:

1. A separator for a lithium-sulfur battery comprising:
   a separator body; and
   a composite coating layer formed on at least one surface of the separator body,
   wherein the composite coating layer comprises a mixture of polydopamine and a conductive material in a weight ratio of 3:1 to 7:1.

2. The separator for a lithium-sulfur battery of claim 1, wherein the composite coating layer has a thickness of 0.1 μm to 10 μm.

3. The separator for a lithium-sulfur battery of claim 1, wherein the conductive material includes one type selected from the group consisting of carbon-based conductors, conductive polymers and combinations thereof.

4. The separator for a lithium-sulfur battery of claim 3, wherein the carbon-based conductor includes one type selected from the group consisting of graphite-based, active carbon-based, carbon black-based, carbon fiber-based, carbon nanostructures and combinations thereof.

5. The separator for a lithium-sulfur battery of claim 3, wherein the conductive polymer includes one type selected from the group consisting of polyaniline, polypyrrole, polythiopene, polyazulene, polypyridine, polyindole, polycarbazole, polyazine, polyquinone, polyacetylene, polyselenophene, polytellurophene, poly-para-phenylene, polyphenylene vinylene, polyphenylene sulfide, polyethylenedioxythiophene and combinations thereof.

6. A separator for a lithium-sulfur battery comprising:
   a separator body;
   a composite coating layer formed on at least one surface of the separator body; and
   a polydopamine coating layer between the separator body and the composite coating layer,
   wherein the composite coating layer comprises polydopamine and a conductive material.

7. The separator for a lithium-sulfur battery of claim 6, wherein the polydopamine coating layer has a thickness of 0.1 μm to 10 μm.

8. A method for preparing a separator for a lithium-sulfur battery comprising:
   i) preparing a separator body;
   ii) preparing a mixture slurry by mixing polydopamine, a conductive material and a solvent,
   wherein mixture of the polydopamine and the conductive material is in a weight ratio of 3:1 to 7:1;
   iii) coating the mixture slurry on at least one surface of the separator body; and
   iv) forming a composite coating layer by drying the coated separator.

9. A method for preparing a separator for a lithium-sulfur battery, comprising:
   i) preparing a separator body;
   ii) preparing a polydopamine slurry;
   iii) coating the polydopamine slurry on the separator body;
   iv) drying the coated separator body;
   v) preparing a mixture slurry by mixing polydopamine, a conductive material and a solvent;
   vi) coating the mixture slurry on at least one surface of the separator body; and
   vii) forming a composite coating layer by drying the coated separator body.

10. A lithium-sulfur battery comprising:
    a positive electrode;
    a negative electrode;

a separator provided between the positive electrode and the negative electrode; and
an electrolyte,
wherein the separator is the separator of claim 1.

\* \* \* \* \*